United States Patent [19]
Morikawa

[11] Patent Number: 6,069,469
[45] Date of Patent: May 30, 2000

[54] CONTROLLER FOR POWER CONVERTER

[75] Inventor: Ryuichi Morikawa, Mie-ken, Japan

[73] Assignee: Kabushiki Kaisha Toshiba, Kawasaki, Japan

[21] Appl. No.: 09/120,235

[22] Filed: Jul. 22, 1998

[30] Foreign Application Priority Data

Jul. 22, 1997 [JP] Japan .................................. 9-195734

[51] Int. Cl.[7] .................................................. G05F 1/70
[52] U.S. Cl. ........................................................ 323/208
[58] Field of Search .................................. 323/205, 207, 323/208, 209, 266

[56] References Cited

U.S. PATENT DOCUMENTS

| | | | |
|---|---|---|---|
| 3,867,683 | 2/1975 | Marchvka | 321/2 |
| 4,616,174 | 10/1986 | Jorgensen | 324/117 R |
| 4,679,130 | 7/1987 | Moscovici | 363/17 |
| 4,961,044 | 10/1990 | Kravitz | 323/205 |
| 5,343,134 | 8/1994 | Wendt et al. | 318/757 |
| 5,568,398 | 10/1996 | Trainor | 364/492 |

*Primary Examiner*—Matthew Nguyen
*Attorney, Agent, or Firm*—Foley & Lardner

[57] ABSTRACT

The controller for a power converter of the present invention, connects a transformer in series with the AC system, and has devices which find the voltage drop portion generated by the impedance of this transformer when introducing a voltage in series by an inverter into the above-mentioned AC system via this transformer, and control the output of the above-mentioned inverter to compensate this voltage drop portion.

7 Claims, 9 Drawing Sheets

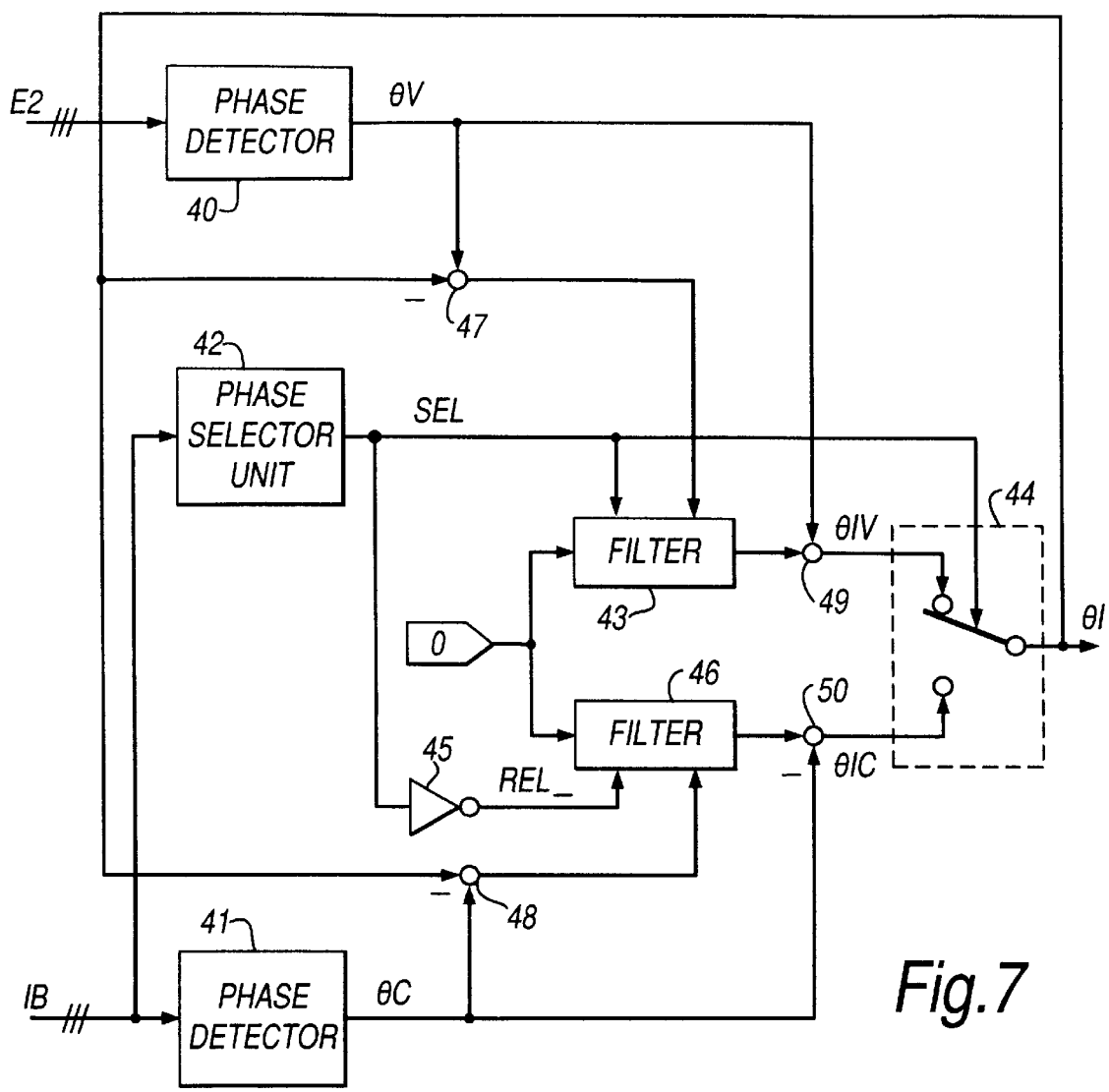
Fig.7
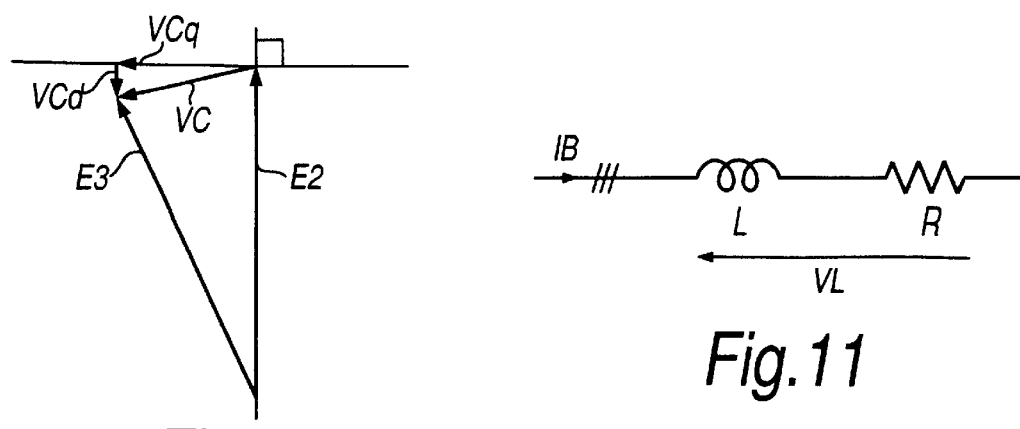
Fig.9
Fig.11

CONTROLLER FOR POWER CONVERTER

BACKGROUND OF THE INVENTION

1. Field of the Invention

This invention relates to a controller for a power converter which supplies an AC output via a transformer connected in series with an AC system and alters the voltage, current or power of that AC system.

2. Description of the Related Art

An AC system is a gigantic circuit network, and a transmission line can be seen as a distributed constant circuit. As this transmission line becomes longer, its impedance drop becomes greater and its current phase lag also becomes larger. Thus, the power which can be transmitted becomes less.

For this reason, voltage sources are provided in series with existing AC systems. There are power regulation units which vary the size and phase of the voltage impressed on these AC systems from such voltage sources and control the active power and reactive power of the AC systems in order to increase the power transmitted by the AC system according to the load demand.

FIG. 1 is a block diagram of an AC system containing such a power regulation unit.

This is a simplified representation of a general AC system. Transmission line 2 is connected to transmission end 1, and power regulation unit 4 which uses voltage type inverter 3 is connected to transmission line 2.

Here, the voltage and phase at transmission end 1 are $E_1$ and $\theta_1$, while the voltage and phase at reception end 5 are $E_2$ and $\theta_2$.

To describe the case of there being no power regulation unit 4, the power P transmitted in the AC system is sent from advanced phase in the direction of delayed phase and is expressed by the following equation. Here $\delta$ is the phase difference angle.

$$P=(E_1 \times E_2/X) \times \sin \delta \quad (1)$$

$\delta=\theta_1-\theta_2$ and X is the impedance of the AC system.

In such as case as this where there is no power regulation unit 4, when a large active power and lag reactive power are required at reception end 5, the voltage drop in transmnission line 2 becomes large. In Equation (1) above, as voltage $E_2$ at reception end 5 becomes lower, phase $\theta_2$ becomes more delayed and phase difference angle $\delta$ becomes larger in order to maintain the transmitted power.

However, to supply stable power, phase difference angle $\delta$ must be within 90°. Moreover, in practice, there is a requirement to operate by giving some scope to phase difference angle 90°, and an that sense there are limits to power transmission.

Also, there are cases when a load exists on the transmission end 1 side and there are generation facilities on the reception end 5 side also, and when transmission of power is carried out by adjusting the power sent in transmission line 2 connecting transmission end 1 and reception end 5. In this case, operation must be performed while balancing by adjusting the voltages and phases of the generation facilities at each of transmission end 1 and reception end 5, and it is extremely difficult accurately to deliver the target power.

However, in power regulation unit 4, the voltage of DC capacitor 7, which is controlled by DC source 6, is converted to AC by inverter 3. This AC is impressed on transmission line 2 via series transformer e, which is inserted in series into transmission line 2. By this means, the power regulation unit has the functions of performing receipt from and delivery to the AC system of its active power and reactive power, and adjusting the active power and reactive power of the AC system.

The following is a concrete explanation of this. On a rotatory coordinate system in which the coordinate of the phase as voltage $E_2$ of reception end 5 is taken as the d axis and the 90°-advanced phase is taken as the q axis, when the conversions of voltage $E_2$ of reception end S and bus current $I_E$ are taken as the d and q axis voltages $E_{2d}$ and $E_{2q}$ and the d and q axis bus currents $I_{Ed}$ and $I_{Eq}$, q axis voltage $E_{2q}$ becomes zero.

Active power P and reactive power Q of reception end 5 at this time are expressed as follows.

$$P=E_{2d} \times I_{Ed} \quad (2)$$

$$Q=-E_{2d} \times I_{Eq} \quad (3)$$

In order to control the voltage of the AC system so that it does not vary too greatly, from the above Equations (2) and (3) it may be said that active voltage P is proportional to d axis current $I_{Ed}$ and reactive voltage Q is proportional to q axis current $I_{Eq}$. In other words, if the bus current is controlled it is possible to control active power P and reactive power Q of the AC system.

Impedance X of the AC system is mainly the inductance component. Therefore, if d axis component $VC_d$ of output voltage VC of power regulation unit 4 is controlled, it is possible to control q axis current $I_{Eq}$ of the bus current, and also if q axis component $VC_q$ of output voltage VC is controlled, it is possible to control d axis current $I_{Ed}$ of the bus current.

For such reasons, power detector unit 9 detects active power P and reactive power Q of the power transmitted on transmission line 2 and outputs them respectively to active power control unit 10 and reactive power control unit 11.

Active power control unit 10 and reactive power control unit 11 are composed of proportional-plus-integral controllers. These respectively output command values $VC_d^*$ and $VC_q^*$ for the d and q axis components of the series compensating voltage VC so that the active power P and reactive power Q detected by power detector unit 9 will approach the command values.

At the same time, phase information detector unit 12 detects the phase information for bus current $I_E$ and outputs this phase information to coordinate inversion unit 13.

Coordinate inversion unit 13 uses the phase information detected by phase Information detector unit 12 and converts command values $VC_d^*$ and $VC_q^*$ of the d and q axis components of series compensating voltage VC by inverting them to an alternating current which is synchronised with the bus current and converting it to a 3-phase voltage command to be outputted from inverter 3. It then supplies that 3-phase voltage command to gate control unit 14.

This gate control unit 14 ON/OFF controls the gates of the switching elements which compose inverter 3 in keeping with the voltage commands for inverter 3 from coordinate inversion unit 13.

Here, in series transformer B, since it has impedance, there are errors between command values $VC_d^*$ and $VC_q^*$ of the d and q axis components and actual values $VC_d$ and $VC_q$ of the d and q axis components of series compensating voltage VC. However, control of active power P and reactive power Q of the AC system is made possible by the actions of active power control unit 10 and reactive power control unit 11.

However, in order to control thoroughly active power P and reactive power Q of the AC system, an extremely large capacity power regulation unit is required. Besides large capacity power regulation units being extremely expensive pieces of equipment, with current technology, their manufacture is difficult in practice.

Also, in a power regulation unit connected to an AC system, apart from control of active power P and reactive power Q of the AC system, the desire is to add the function of performing stabilization when the AC system is oscillating.

This stabilization function is possible with a power regulation unit of a smaller capacity than the capacity required to control thoroughly active power P and reactive power Q of the AC system. For this reason, there is a requirement for the function of performing stabilization of the AC system and to control active power P and reactive power Q of the AC system with a power regulation unit of limited capacity.

When performing the above type of control of active power P and reactive power Q with a power regulation unit of smaller capacity than the transmission capacity of the AC system, the scope in which that control is possible is a very small range. Within this possible control range it is extremely difficult to provide commands to the power regulation unit for active power P and reactive power Q of the AC system.

Therefore, this invention has as its object the provision of a controller for a power converter with a limited capacity which can effectively and stably adjust the active power and the reactive power of an AC system.

SUMMARY OF THE INVENTION

Accordingly one object of the present invention is, in a controller for a power converter in which a transformer is connected to an AC system and which supplies the AC power of an inverter to the AC system via this transformer and varies the voltage and current, or power, of this AC system, to provide a controller for a power converter which is equipped with a feedback control device which seeks the voltage drop portion generated by the impedance of the transformer and controls the inverter output so that it compensates this voltage drop portion.

The above object of the present invention can be achieved, in a controller for a power converter, by providing a controller for a power converter in which the feedback control device possesses a phase information detector device which detects phase information from the bus voltage and bus current of the AC system;

an impedance drop compensator unit which finds the voltage drop portion generated by the impedance of the transformer based on the current of the AC system, the impedance of the transformer and the phase information detected by the phase information detector device;

adders which input the command voltages relating to a first voltage component of the same phase as the bus voltage of the AC system in the voltage supplied via the transformer to the AC system and a second voltage component of a phase which is advanced a specified phase from that phase, subtract the voltage drop portion found by the impedance drop compensator unit from these command voltages, and output the result as inverter voltage commands; and an inverter control device which restores the inverter voltage command outputted from these adders to the phase of the AC system based on the phase information detected by the phase information detector device, and operationally controls the inverter.

Also, the above object of the present invention can be achieved, in a controller for a power converter, by providing a controller for a power converter which possesses a coordinate conversion unit which outputs a first voltage component of the same phase as the bus voltage by coordinate conversion of the voltage supplied via the transformer to the AC system, and a second voltage component of a phase which is advanced a specified phase from that phase; and a voltage control unit which finds the deviations between the first and second voltage components outputted from this coordinate conversion unit and these command voltages, and sends voltages which will reduce these deviations to the adders as command voltages.

Moreover, the above object of the present invention can be achieved, in a controller for a power converter, by providing a controller for a power converter which is equipped with a signal switching unit which compares the bus current with a pre-determined threshold and, when the bus current is smaller than the threshold, provides the bus voltage to the phase information detector unit and, when the bus current is greater than the threshold, provides the bus current to the phase information detector unit.

Furthermore, the object of the present invention can be achieved, in a controller for a power converter, by providing a controller for a power converter which is equipped with a signal switching unit which detects oscillation from the bus current and, depending on the size of this oscillation, provides the bus voltage or the bus current to the phase information detector unit and, when the oscillation does not very from a specified range, provides a signal of the same type as the signal which was used in the past to the phase information detector unit.

Even further, the object of the present invention can be achieved, in a controller for a power converter, by providing a controller for a power converter in which the phase information detector device possesses a first phase detector which detects phase information for the bus voltage;

a second phase detector which detects phase information for the bus current;

a phase selector unit which outputs a phase selection signal according to the size of the bus current;

filter devices which obtain the difference between the phase of the bus voltage or the phase of the bus current and at least the phase information which is provided to the impedance drop compensator unit or the output of a first-order lag characteristic; and a phase switching unit which selects the output of the filter devices according to the phase selection signal outputted from the phase selector unit.

Still further, the object of the present invention can be achieved, in a controller for a power converter, by providing a controller for a power converter which is equipped with a second voltage component arithmetic unit which computes the command voltages for a first voltage component of the same phase for the bus voltage of the AC system and for a second voltage component of a phase specifically phase-advanced from the phase of the first voltage component based on the bus voltage, and applies these command voltages to a voltage control unit.

Yet further, the object of the present invention can be achieved, in a controller for a power converter, by providing a controller for a power converter which is equipped with a voltage command arithmetic unit which computes the first and second voltage components in the voltage supplied via the transformer to the AC system based on the phase information for the bus current and the bus voltage and the impedance command for the transformer, and applies these first and second voltage components to the voltage control unit.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 7 is a block diagram showing a sixth embodiment of the phase information detector device applied in a controller for a power converter concerned in the present invention;

FIG. 9 is a vector diagram portraying the bus voltage and the series compensation voltage VC for both ends of the series transformer, taking the bus voltage as the reference.

FIG. 11 is a diagram showing a 3-phase AC bus which includes impedance of reactor and resistor.

DETAILED DESCRIPTION OF THE PREFERRED EMBODIMENTS

Figure 1:
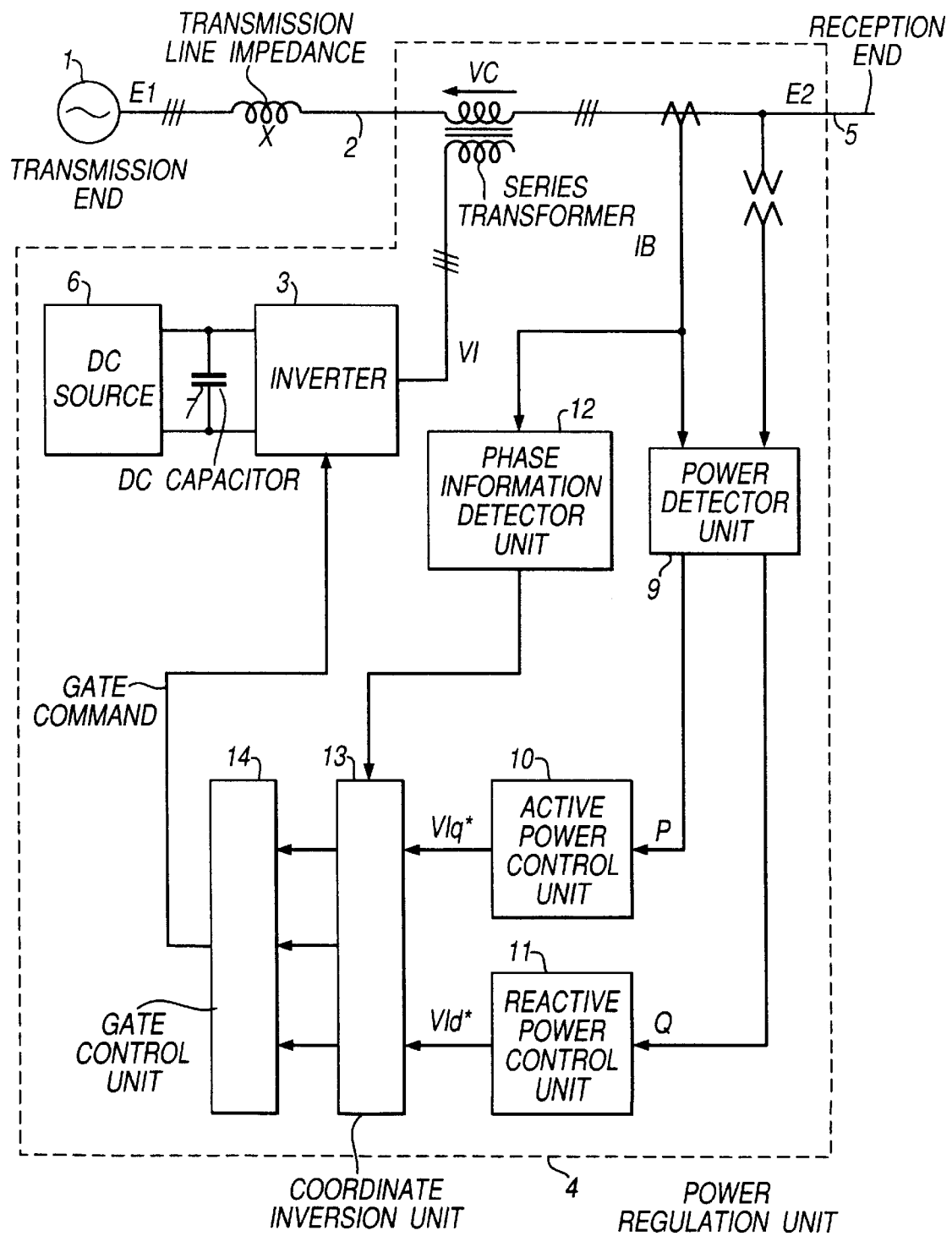
FIG. 1 is a block diagram of an AC system which includes a prior art power regulation unit.

Referring now to the drawings, wherein like reference numerals designate identical or corresponding pares throughout the several views, and more particularly to FIG. 2 thereof, one embodiment of the present invention will be described.

Identical reference numbers have been given to parts identical to those in FIG. 1, and detailed descriptions of them have been omitted.

Figure 2:
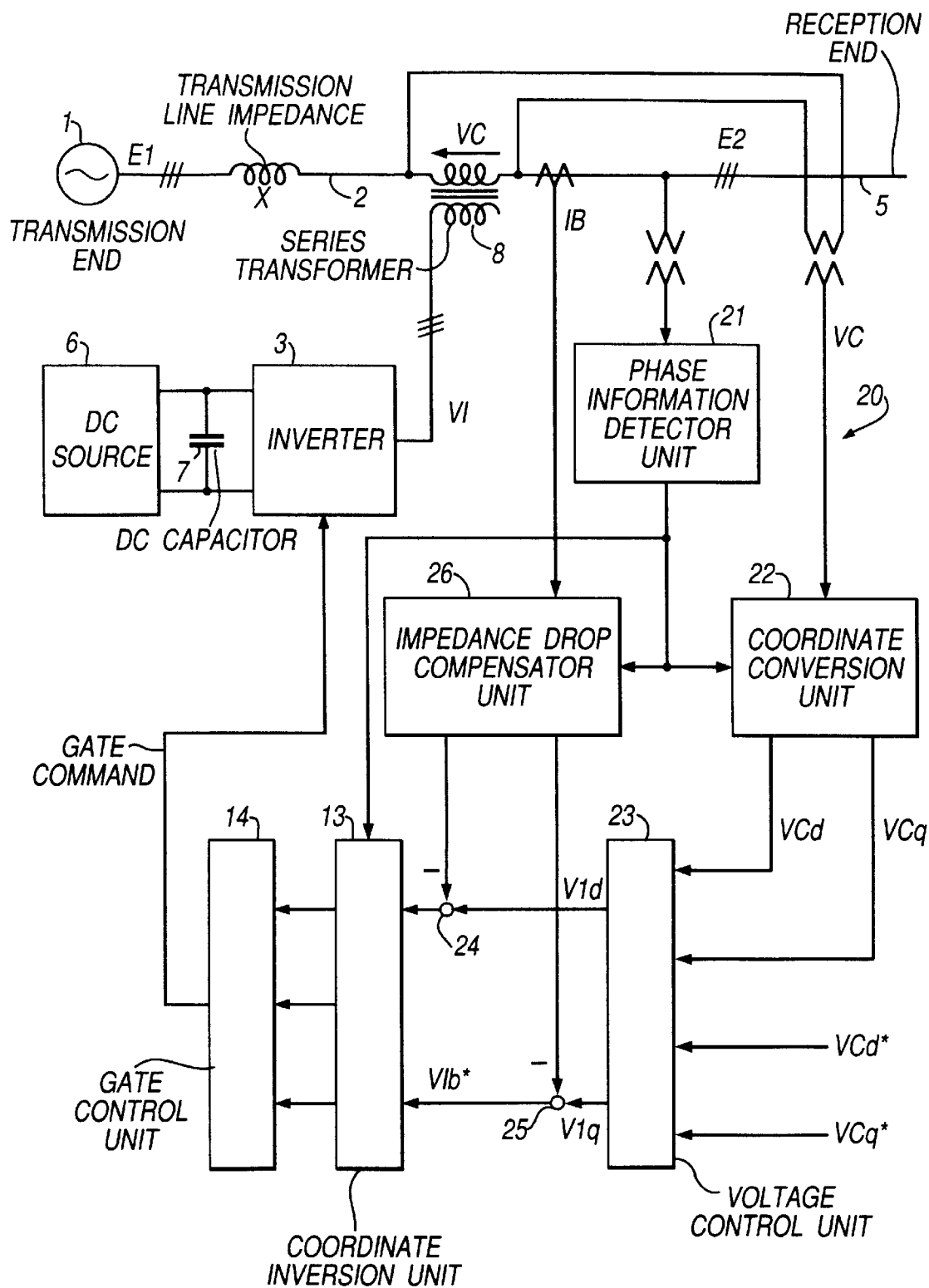
FIG. 2 is a block diagram showing a first embodiment of a controller for a power converter concerned in the present invention.

FIG. 2 is a block diagram of a controller for a power converter.

In this controller for a power converter, feedback control device 20 is provided which finds the voltage drop portion generated by the impedance of series transformer 8, and controls the output of inverter 3 so that it compensates this voltage drop portion.

That is to say, phase information detector unit 21 has the function of detecting phase information θ from bus voltage $E_2$ of the AC system (hereafter, described as transmission line 2).

Coordinate conversion unit 22 has the function of outputting d axis component $VC_d$ of the same phase as bus voltage $E_2$ of transmission line 2 (first voltage component) and q axis component $VC_q$ of a phase advanced 90° from the phase of this d axis component $VC_d$ (second voltage component) by coordinate conversion from the 3 phases of series compensating voltage VC, which is inputted in series into transmission line 2 via series transformer 8.

Voltage control unit 23 has the function of comparing d axis component $VC_d$ and q axis component $VC_q$ of series compensating voltage VC outputted from coordinate conversion unit 22 with their command voltages $VC_d^*$ and $VC_q^*$ and finding any deviations. It then performs proportional-plus-integral processing of the respective deviations to make these deviations smaller, outputs the results as command voltages $V_{Id}$ and $V_{Iq}$, and sends them respectively to adders 24 and 25.

At the same time, impedance drop compensator unit 26 has the function of finding the voltage drop portion generated by the impedance of series transformer 8 based on bus current $I_B$ of transmission line 2, the impedance of series transformer 8 and phase information θ detected by phase Information detector unit 21, that is to say, of calculating the right-hand side of Equation (4) below.

That is to say, when the winding ratio of series transformer 8 is taken as 1 and resistance R and inductance L are expressed equivalently, the following relationship will exist between output voltage VI of inverter 3 and series compensation voltage VC.

$$\begin{bmatrix} VCd - VId \\ VCq - VIq \end{bmatrix} = \begin{bmatrix} R + sL & -\omega L \\ \omega L & R + sL \end{bmatrix} \begin{bmatrix} IBd \\ IBq \end{bmatrix} \quad (4)$$

Here, s is a differential operator, $I_s$ is the bus current, and suffixes d and q to VI, VC and $I_B$ indicate the d axis component of the same phase and the 90°-advanced q axis component of bus voltage $E_2$ of each voltage and current respectively in the same way as above.

As can be seen from the above Equation (4), a difference occurs only in the portion of the voltage drop generated by the impedance contained in series transformer 8 and current $I_s$ flowing in that impedance, In impedance drop compensator unit 26, phase information θ is used to calculate d and q axis currents $I_{Bd}$ and $I_{Bq}$ from bus current $I_B$.

Adders 24 and 25 have the functions of respectively inputting command voltages $V_{Id}$ and $V_{Iq}$ which are outputted from voltage control unit 23, subtracting the voltage drop portion found by impedance drop compensator unit 26 from these command voltages $V_{Id}$ and $V_{Iq}$, and sending the respective results to coordinate inversion unit 13 as the d axes component and q axis component of the voltage command for inverter 3.

The following is a description of the operation of a device composed in the above way.

Phase information detector unit 21 detects phase information θ from bus voltage $E_2$ of transmission line 2, and sends this phase information θ to coordinate conversion unit 22, impedance drop compensator unit 26 and coordinate inversion unit 13.

Of these, coordinate conversion unit 22 outputs d axis component $VC_d$ of the same phase as bus voltage $E_2$ and q axis component $VC_q$ of a phase advanced 90° from the d axis component $VC_d$ by coordinate conversion from the 3 phases of series compensating voltage VC which is supplied to transmission line 2 from series transformer 8.

Voltage control unit 23 compares d axis component $VC_d$ and q axis component $VC_q$ of series compensating voltage VC which are outputted from coordinate conversion unit 22 with their command voltages $VC_d{}^*$ and $VC_q{}^*$ and finds any deviations. It then outputs the results of proportional-plus-integral processing of each deviation so that the deviations become smaller as command voltages $V_{Id}$ and $V_{Iq}$.

At the same time, impedance drop compensator unit 26 finds the voltage drop portion generated by the impedance of series transformer 8 based on bus current $I_B$ of transmission line 2, the impedance of series transformer 8 and phase information θ detected by phase information detector unit 21. It then sends this voltage drop portion to each of adders 24 and 25.

Adders 24 and 25 respectively input command voltages $V_{Id}$ and $V_{Iq}$ which are outputted from voltage control unit 23. They then subtract the voltage drop portion found by impedance drop compensator unit 26 from these command voltages $V_{Id}$ and $V_{Iq}$ and send the respective results to coordinate inversion unit 13 as the d axis component and q axis Component of the voltage command for inverter 3.

Coordinate inversion unit 13 uses phase information θ detected by phase information detector unit 21 and converts command values $VC_d{}^*$ and $VC_q{}^*$ of the d and q axis components of series compensating voltage VC to voltage commands for the 3 phases which are outputted by inverter 3 by inverting those values to an alternating current which is synchronised with the bus current. It then provides those 3-phase voltage commands to gate control unit 14.

Gate control unit 14 exercises ON/OFF control of the gates of the switching elements which compose inverter 3 in accordance with the inverter 3 voltage commands from coordinate inversion unit 13.

In this way, in the above first embodiment, the voltage drop portion generated by the impedance of series transformer 8 is found, and the output voltage of inverter 3 is controlled so that this voltage drop portion is compensated. Therefore, the d and q axis components $VC_d$ and $VC_q$ of series compensating voltage VC, which is introduced in series into transmission line 2 through series transformer 8, can be controlled independently and speedily and, moreover, stably. That is to say, active power P and reactive power Q of an AC system can be effectively and stably adjusted with a limited capacity.

It is difficult accurately to know resistance R and inductance L of series transformer 8. Therefore, in practice, resistance R and inductance L are found by using the resistance R and the inductance L obtained as the design values of series transformer 8, while adjusting the equipment. Even if the values of resistance R and inductance L obtained by so doing are used, this does not deviate from the purport of the present invention.

Also, a term which differentiates bus current $I_B$ is included in the right-hand side of Equation (4) above. However, in cases which will present no great problems in practical use, even if the controller is composed by omitting or simplifying this term, the term which differentiates bus current $I_B$ may be omitted or simplified.

(2) The following is a description, with reference to the drawings, of a second embodiment of the present invention. Identical reference numbers have been given to parts which are identical to those in FIG. 2 and their detailed descriptions have been omitted.

Figure 3:
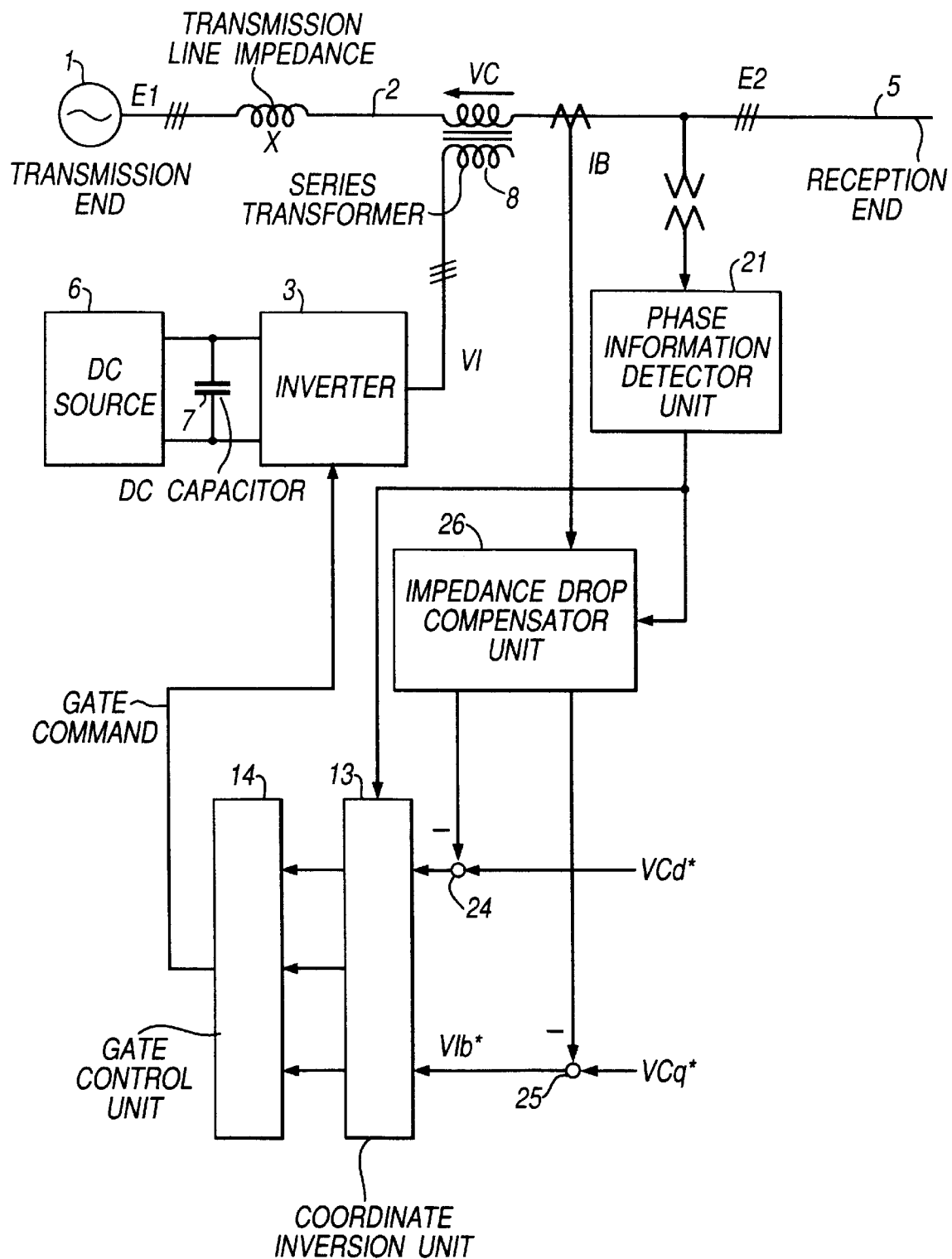
FIG. 3 is a block diagram showing a second embodiment of a controller for a power converter concerned in the present invention.

FIG. 3 is a block diagram of a controller for a power converter.

Adders 24 and 25 input the respective command voltages $VC_d{}^*$ and $VC_q{}^*$ of the d and q axis components $VC_d$ and $VC_q$ of series compensating voltage VC which is introduced into transmission line 2. They have the function of subtracting the voltage drop portion found by impedance drop compensator unit 26 from these command voltages $VC_d{}^*$ and $VC_q{}^*$ and outputting the results as inverter 3 voltage commands.

The following is a description of the operation of a device composed in the above way.

Phase information detector unit 21 detects phase information θ from bus voltage $E_2$, and sends this phase information θ to impedance drop compensator unit 26 and coordinate inversion unit 13.

Of these, impedance drop compensator unit 26 finds the voltage drop portion generated by the impedance of series transformer 8 based on bus current $I_B$ of transmission line 2, the impedance of series transformer 8 and phase information θ detected by phase information detector unit 21. It then sends this voltage drop portion to each of adders 24 and 25.

Adders 24 and 25 input the respective command voltages $VC_d{}^*$ and $VC_q{}^*$ of d and q axis components $VC_d$ and $VC_q$ of series compensating voltage VC which is introduced into transmission line 2. They then subtract the voltage drop portion found by impedance drop compensator unit 26 from these command voltages $VC_d{}^*$ and $VC_q{}^*$ and send the respective results to coordinate inversion unit 13 as voltage commands for inverter 3.

Coordinate inversion unit 13 uses phase information θ0 detected by phase information detector unit 21 and converts command values $VC_d{}^*$ and $VC_q{}^*$ of the d and q axis components of series compensating voltage VC to voltage commands for the 3 phases which are outputted by inverter 3 by inverting those values to an alternating current which is synchronised with the bus current. It then provides those 3-phase voltage commands to gate control unit 14.

Gate control unit 14 exercises ON/OFF control of the gates of the switching elements which compose inverter 3 in accordance with the inverter 3 voltage commands from coordinate inversion unit 13, In this way, in the above second embodiment, in the same way as in the above first embodiment, the voltage drop portion generated by the impedance of series transformer 8 is found, and the output voltage of inverter 3 is controlled so that this voltage drop portion is compensated. Therefore, the d and q axis components $VC_d$ and $VC_q$ of series compensating voltage VC, which is introduced in series into transmission line 2 through series transformer 8, can be controlled independently and speedily and, moreover, stably. That is to say, active power P and reactive power Q of an AC system can be effectively and stably adjusted with a limited capacity.

(3) The following is a description, with reference to the drawings, of a third embodiment of the present invention. Identical reference numbers have been given to parts which are identical to those in FIG. 2 and their detailed descriptions have been omitted.

Figure 4:
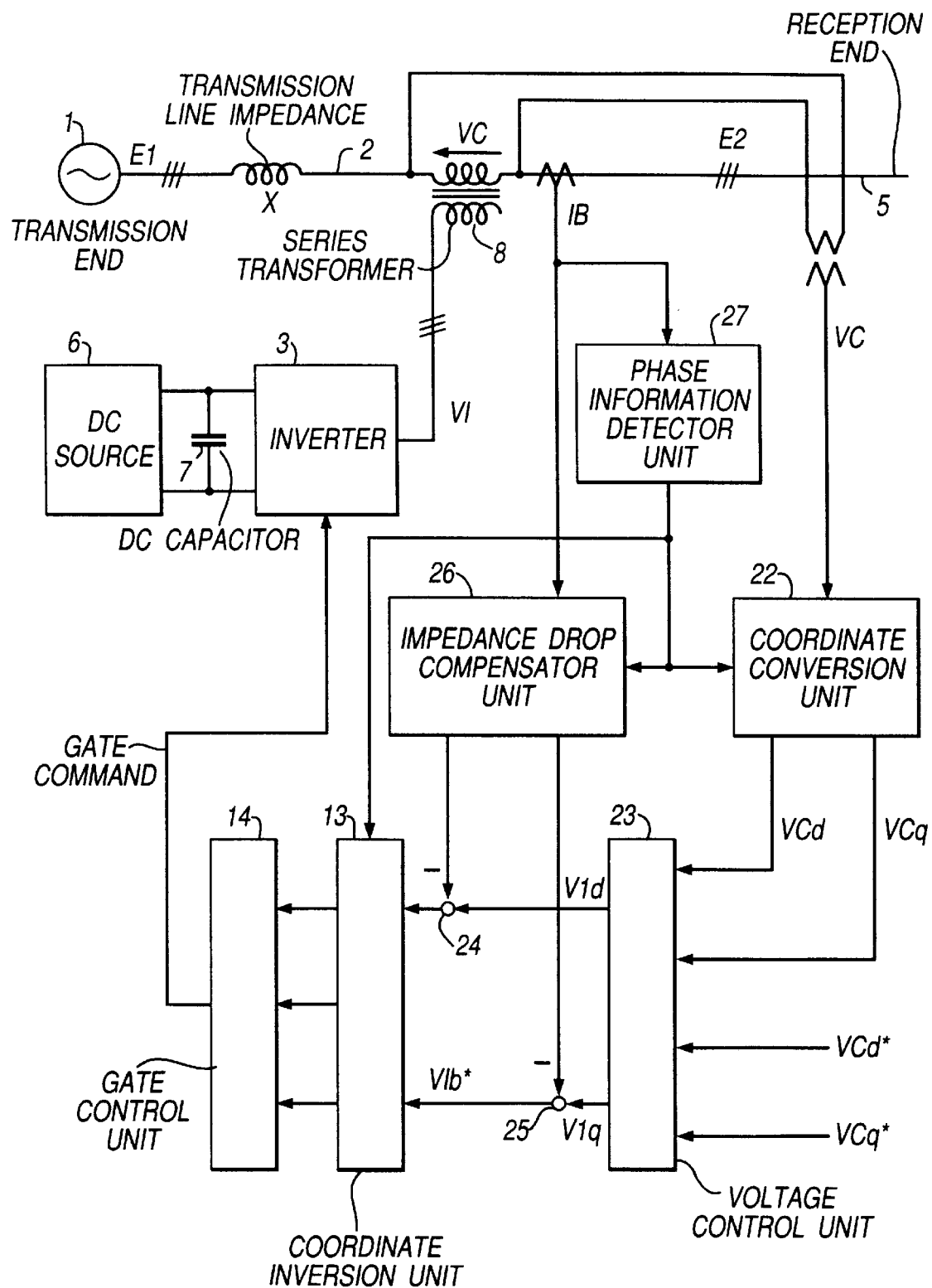
FIG. 4 is a block diagram showing a third embodiment of a controller for a power converter concerned in the present invention.

FIG. 4 is a block diagram of a controller for a power converter.

Phase information detector unit 27 has the function of detecting phase information θ from bus current $I_B$ of transmission line 2, and of sending this phase information θ to coordinate conversion unit 22, impedance drop compensator unit 26 and coordinate inversion unit 13.

The following is a description of the operation of a device composed in the above way.

Phase information detector unit 27 detects phase information θ from bus current $I_B$ of transmission line 2, and sends this phase information θ to coordinate conversion unit 22, impedance drop compensator unit 26 and coordinate inversion unit 13.

Of these, coordinate conversion unit 22 outputs d axis component $VC_d$ and q axis component $VC_q$ of the same phase as bus voltage $E_2$ by carrying out coordinate conversion of series compensating voltage VC which is supplied to transmission line 2. Voltage control unit 23 outputs the results of proportional-plus-integral processing of each deviation so that the deviations between d axis component $VC_d$ and q axis component $VC_q$ and their command voltages $VC_d^*$ and $VC_q^*$ become smaller as command voltages $V_{Id}$ and $V_{Iq}$.

At the same time, impedance drop compensator unit 26 finds the voltage drop portion generated by the impedance of series transformer 8 based on bus current $I_B$ of transmission line 2, the impedance of series transformer 8 and phase information θ detected by phase information detector unit 27. It then sends this voltage drop portion to each of adders 24 and 25.

Adders 24 and 25 respectively subtract the voltage drop portion found by impedance drop compensator unit 26 from command voltages $V_{Id}$ and $V_{Iq}$ which are outputted from voltage control unit 23. They then send the respective results to coordinate inversion unit 13 as the d axis component and q axis component of the voltage command for inverter 3.

Coordinate inversion unit 13 uses phase information θ detected by phase information detector unit 27 and converts command values $VC_d^*$ and $VC_q^*$ of the d and q axis components of series compensating voltage VC to voltage commands for the 3 phases which are outputted by inverter 3 by inverting those values to an alternating current which is synchronised with the bus current. It then provides those 3-phase voltage commands to gate control unit 14. Gate control unit 14 exercises ON/OFF control of the gates of the switching elements which compose inverter 3 in accordance with those 3-phase voltage commands.

In this way, when using the above third embodiment, phase information θ is first found from bus current $I_B$. Then the voltage drop portion generated by the impedance of series transformer 8 is found using phase information θ, and the output voltage of inverter 3 is controlled so that this voltage drop portion is compensated. Therefore, component $VC_d$ of the same phase as bus current $I_B$ and the 90°-advanced component $VC_q$ of series compensating voltage VC, which is introduced in series into transmission line 2, can be controlled independently and speedily and, moreover, stably. That is to say, active power P and reactive power Q of an AC system can be effectively and stably adjusted with a limited capacity.

(4) The following is a description, with reference to the drawings, of a fourth embodiment of the present invention. Identical reference numbers have been given to parts which are identical to those in FIG. 2 and their detailed descriptions have been omitted.

Figure 5:
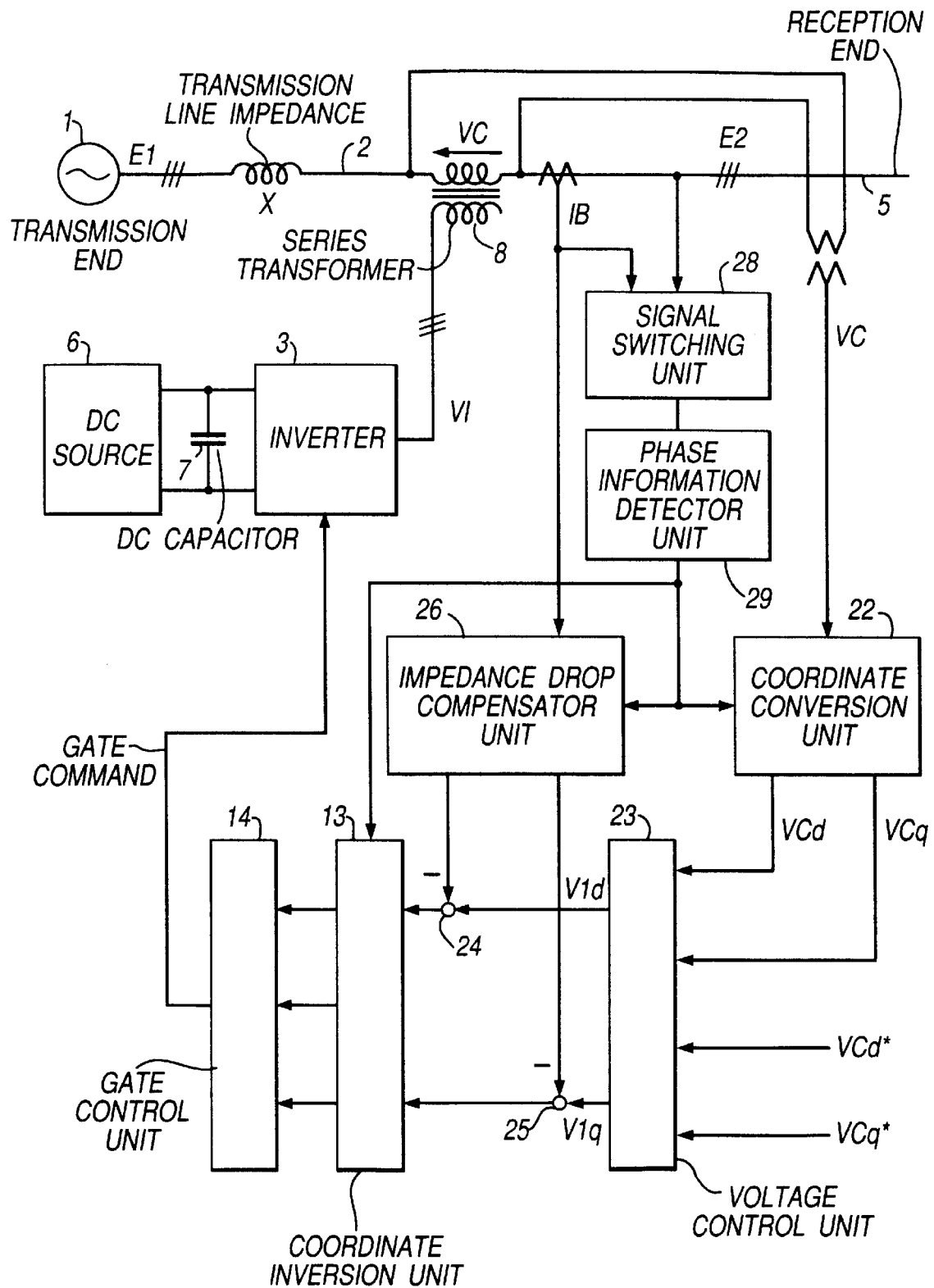
FIG. 5 is a block diagram showing a fourth embodiment of a controller for a power converter concerned in the present invention.

FIG. 5 is a block diagram of a controller for a power converter.

Signal switching unit 28 has the function of comparing bus current $I_B$ with a pre-determined threshold and of providing bas voltage $E_2$ to phase information detector unit 29 when bus current $I_B$ is smaller than the threshold and providing bus current $I_B$ to phase information detector unit 29 when bus current $I_B$ is larger than the threshold.

Phase information detector unit 29 has the function of inputting bus current $I_B$ or bus voltage $E_2$ through the switching operation of signal switching unit 28, detecting phase information θ from bus current $I_B$ or bus voltage $E_2$, and of sending that information to coordinate conversion unit 22, impedance drop compensator unit 26 and coordinate inversion unit 13.

The following is a description of the operation of a device composed in the above way.

Signal switching unit 28 compares bus current $I_B$ with a pre-determined threshold and, if bus current $I_B$ is smaller than the threshold, provides bus voltage $E_2$ to phase information detector unit 29. Also, if bus current $I_B$ is larger than the threshold, it supplies bus current $I_B$ to phase information detector unit 29.

That is to say, as bus current $I_B$ becomes smaller, the obtaining of correct phase information θ for bus current $I_B$ becomes more difficult due to bus current $I_B$ detector error, electromagnetic noise, etc. When correct phase information θ for bus current $I_B$ cannot be obtained, independent and stable control of component $VC_d$ of the same phase as bus current $I_B$ of series compensating voltage VC, which is introduced in series into the AC system, and of the 90°-advanced component $VC_q$ becomes impossible.

In an AC system, whereas the size of bus current $I_B$ varies significantly due to the state of the load and the like, bus voltage $E_2$ can be kept almost stable.

Therefore, by providing bus voltage $E_2$ to phase information detector unit 29 through signal switching unit 28 when bus current $I_B$ is smaller than a threshold value, series compensating voltage VC, which is introduced in series into the AC system, can be prevented from becoming unstable in a state in which bus current $I_B$ is small.

Consequently, phase information detector unit 29 inputs bus current $I_B$ or bus voltage $E_2$ through the switching operation of signal switching unit 28, detects phase information θ from bus current $I_B$ or bus voltage $E_2$, and sepd it to coordinate conversion unit 22, impedance drop compensator unit 26 and coordinate inversion unit 13.

Thereafter, in the same way as in the operation of the first embodiment, coordinate conversion unit 22 outputs d axis component $VC_d$ and q axis component $VC_q$ by coordinate conversion from the 3 phases of series compensating voltage VC. Then voltage control unit 23 outputs the results of proportional-plus integral processing, so that the deviations become smaller, of the deviations between d axis component $VC_d$ and q axis component $VC_q$ and their command voltages $VC_q^*$ and $VC_q^*$ as command voltages $V_{Id}$ and $V_{Iq}$.

At the same time, impedance drop compensator unit 26 finds the voltage drop portion generated by the impedance of series transformer 8 based on bus current $I_B$ of transmission line 2, the impedance of series transformer 8 and phase information θ. It then sends this voltage drop portion to each of adders 24 and 25, Adders 24 and 25 respectively subtract the voltage drop portion found by impedance drop compensator unit 26 from the above command voltages $V_{Id}$ and $V_{Iq}$. They then send the respective results to coordinate inversion unit 13 as the d axis component and q axis component of the voltage command for inverter 3.

Coordinate inversion unit 13 uses phase information θ and converts command values $VC_d^*$ and $VC_q^*$ of the d and q axis components of series compensating voltage VC to voltage commands for the 3 phases which are outputted by inverter 3 by inverting those values to an alternating current which is synchronised with the bus current. It then provides those 3-phase voltage commands to gate control unit 14. Gate control unit 14 exercises ON/OFF control of the gates of the switching elements which compose inverter 3 in accordance with those 3-phase voltage commands.

In this way, when using the above fourth embodiment, in the same way as for the above first embodiment, component $VC_d$ of the same phase as bus current $I_B$ and the 90°-advanced component $VC_q$ of series compensating voltage VC, which is introduced in series into transmission line 2, can be controlled independently and speedily and, moreover, stably. Thus, active power P and reactive power Q of an AC system can be effectively and stably adjusted with a limited capacity. In addition, by providing bus voltage $E_2$ to phase information detector unit 29 through signal switching unit 28 when bus current $I_B$ is smaller than a threshold, series compensating voltage VC, which is introduced in series into the AC system, can be prevented from becoming unstable in states in which bus current $I_B$ is small.

(5) The following is a description, with reference to the drawings, of a fifth embodiment of the present invention. Identical reference numbers have been given to parts which are identical to those in FIG. 2 and their detailed descriptions have been omitted.

Figure 6:
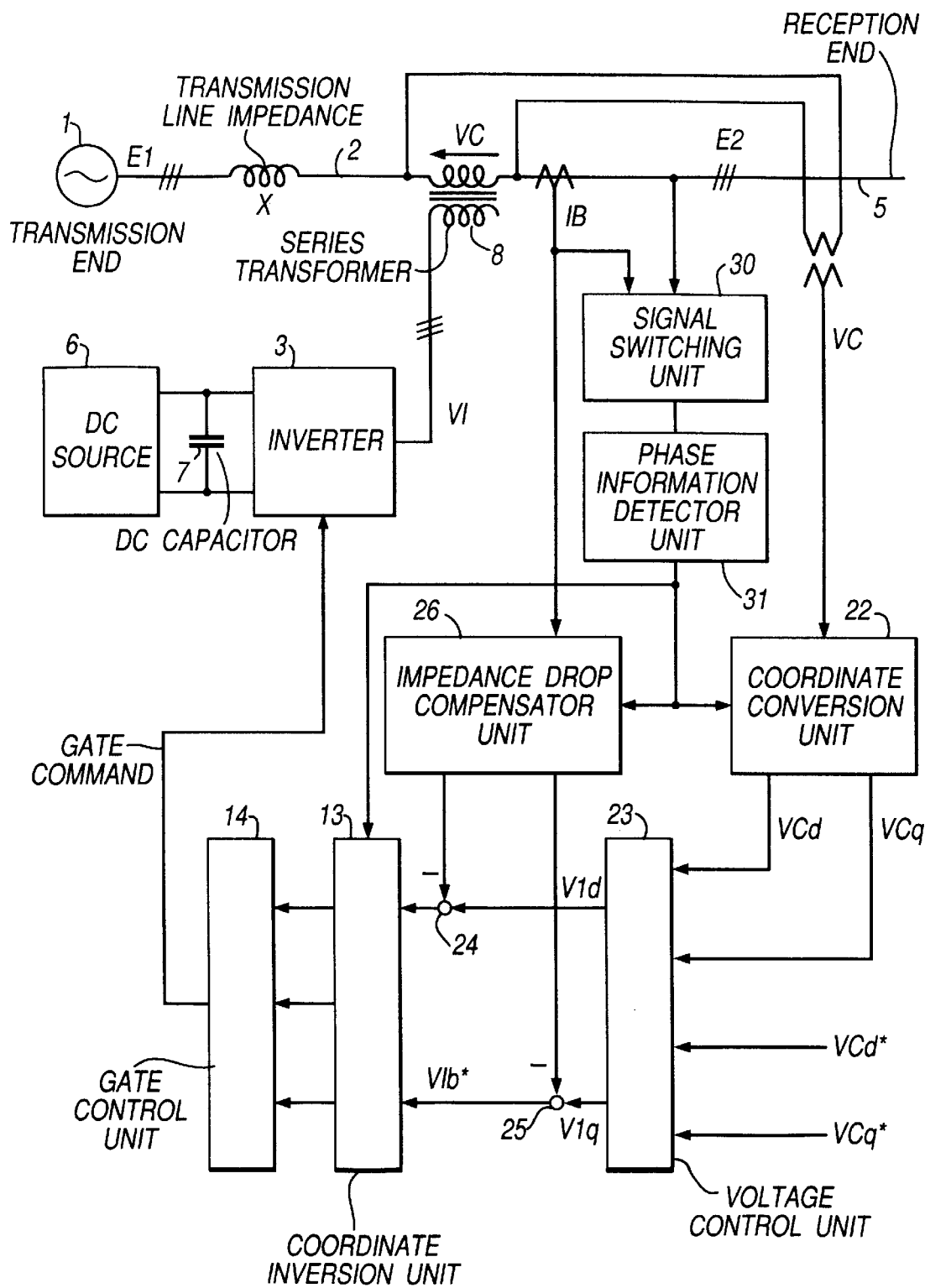
FIG. 6 is a block diagram showing a fifth embodiment of a controller for a power converter concerned in the present invention.

FIG. 6 is a block diagram of a controller for a power converter.

Signal switching unit 30 has the function of detecting oscillation IBM from bus current $I_B$, arid providing bus voltage $E_2$ or bus current $I_B$ to phase information detector unit 31 depending on the size of this oscillation IBM. In addition, when oscillation IBM does not vary from a specified range, it has the function of providing to phase information detector unit 31 a signal of identical type to the signal used in the past.

In practice, signal switching unit 30 has the function of detecting oscillation IBM from bus current $I_B$. When oscillation IBM is in a smaller range than first threshold $R_1$, it has the function of providing bus voltage $E_2$ to phase information detector unit 31. When oscillation IBM is in a larger range than second threshold $R_2$ ($>R_1$), it has the function of providing bus current $I_B$ to phase information detector unit 31.

Also, signal switching unit 30 has the function of continuing to provide bus voltage $E_2$ to phase information detector unit 31 when oscillation IBM has changed from a state of being smaller than to a state of being larger than threshold $R_1$. It also has the function of continuing to provide bus current $I_B$ to phase information detector unit 31 when oscillation IBM has changed from a state of being larger than to a state of being smaller than threshold $R_2$. Moreover, it has the function of continuing to provide to phase information detector unit 31 a signal of identical type to the signal which was used in the past when oscillation IBM does not vary from a range which is larger than first threshold $R_1$ but smaller then second threshold $R_2$.

The following is a description of the operation of a device composed in the above way.

In the above way, signal switching unit 30 detects oscillation IBM from bus current $I_B$. When oscillation IBM is in a smaller range than first threshold $R_1$, it provides bus voltage $E_2$ to phase information detector unit 31. When oscillation IBM is in a larger range than second threshold $R_2$ ($>R_1$), it provides bus current $I_B$ to phase information detector unit 31.

Also, signal switching unit 30 continues to provide bus voltage $E_2$ to phase information detector unit 31 when oscillation IBM has changed from a state of being smaller than to a state of being larger than threshold $R_1$. It also continues to provide bus current $I_B$ to phase information detector unit 31 when oscillation run has changed from a state of being larger than to a state of being smaller than threshold $R_2$. Moreover, it continues to provide to phase information detector unit 31 a signal of identical type to the signal which was used in the past when oscillation IBM does not vary from a range which is larger than first threshold $R_1$ but smaller than second threshold $R_2$.

When bus voltage $E_2$ or bus current $I_B$ is provided to phase information detector unit 31 by switching depending on the size of oscillation IBM from bus current $I_B$ in this way, phase information detector unit 31 detects phase information θ from the switched bus voltage $E_2$ or bus current $I_B$ and sends this phase information θ to coordinate conversion unit 22, impedance drop compensator unit 26 and coordinate inversion unit 13.

Thereafter, in the same way as in the operation of the first embodiment, coordinate conversion unit 22 outputs d axis component $VC_d$ and q axis component $VC_q$ by coordinate conversion from series compensating voltage VC. Then voltage control unit 23 outputs the results of proportional-plus-integral processing, so that the deviations become smaller, of the deviations between d axis component $VC_d$ and q axis component $VC_q$ and their command voltages $VC_d{}^*$ and $VC_q{}^*$ as command voltages $V_{Id}$ and $V_{Iq}$.

At the same time, impedance drop compensator unit 26 finds the voltage drop portion generated by the impedance of series transformer 8 based on bus current $I_B$ of transmission line 2, the impedance of series transformer 8 and phase information θ. It then sends this voltage drop portion to each of adders 24 and 25.

Adders 24 and 25 respectively subtract the voltage drop portion found by impedance drop compensator unit 26 from the above command voltages $V_{Id}$ and $V_{Iq}$. They then send the respective results to coordinate inversion unit 13 as the d axis component and q axis component of the voltage command for inverter 3.

Coordinate inversion unit 13 uses phase information θ and inverts command values $VC_d{}^*$ and $VC_q{}^*$ of the d and q axis components of series compensating voltage VC and provides them to gate control unit 14 as 3-phase voltage commands. Gate control unit 14 exercises ON/OFF control of the gates of the switching elements which compose inverter 3 in accordance with these 3-phase voltage commands.

In this way, when using the above fifth embodiment, needless to say the same results are achieved as for the above first embodiment. For example, with bus current $I_B$ in the vicinity of the first threshold, there are cases when a hunting phenomenon occurs in which there are multiple variations of the result of comparison between the size of bus current $I_B$ and the threshold within a short space of time. However, oscillation IBM is detected from bus current $I_B$, and bus voltage $E_2$ or bus current $I_B$ is provided to phase information detector unit 31 depending on the size of this oscillation IBM. Also, a hysteresis characteristic is provided so that, when oscillation IBM does not vary from a specified range, the same type of signal as the signal used in the past is provided to phase information detector unit 31. Therefore, the hunting phenomenon, in which there are multiple variations of the result of comparison between the size of bus current $I_B$ and the threshold within a short space of time, can be controlled. Thus, stable control of series compensating voltage Vc introduced into the AC system is possible.

(6) The following is a description, with reference to the drawings, of a sixth embodiment of the present invention. Identical reference numbers have been given to parts which are identical to those in FIG. 2 and their detailed descriptions have been omitted.

FIG. 7 is a block diagram of a phase information detector device applied in a controller for a power converter. This phase information detector device is used, for example, in place of signal switching unit 28 and phase information detector unit 29 in the above fourth embodiment.

That is to say, with the above fourth embodiment, series compensating voltage VC introduced in series into the AC system is controlled using phase information θ of bus current $I_B$ or bus voltage $E_2$. Here, when the phase bus of current $I_B$ or bus voltage $E_2$ differs greatly, a large transient phenomenon is generated when the phase information θ used is switched, and series compensating voltage VC will vary greatly. This applies a transient effect to the stability of series compensating voltage VC and the tidal current of the AC system.

Consequently, the present invention is to reduce this transient effect using the phase information detector device shown in FIG. 7.

First phase detector 40 has the function of detecting phase information θV of bus voltage $E_2$. Second phase detector 41 has the function of detecting phase information θC of bus current $I_B$.

Also, phase selector unit 42 has the function of outputting a phase selection signal SEL which depends on the size of bus current $I_B$. For example, when bus current $I_B$ is smaller than a pre-determined threshold it outputs a phase selection signal SEL of "1", and when larger it outputs a phase selection signal SEL of "0".

Phase selection signal SEL outputted from phase detector unit 42 is sent to first first-order lag filter circuit 43 and phase switching unit 44. At the same time, it is sent to second first-order lag filter circuit 46 via inversion unit 45.

Also, first subtracter 47 has the function of finding the difference between phase θV of bus voltage $E_2$ outputted from first phase detector unit 40 and phase signal θI which is the output of the phase information detector device, and of sending this to first first-order lag filter circuit 43.

Second subtracter 48 has the function of finding the difference between phase θC of bus current θI outputted from second phase detector unit 41 and phase signal θI which is output of the phase information detector device, and of sending this to second first-order lag filter circuit 46.

First first-order lag filter circuit 43, when phase selection signal SEL is "0", has the function of outputting the output of first subtracter 47, that is to say, of outputting the difference between phase θV of bus voltage $E_2$ outputted from first phase detector unit 40 and phase signal θI. When phase selector signal SEL becomes "1", it has the function of changing its output using the first-order lag characteristic which takes the difference between phase θV of bus voltage $E_2$ and phase signal θI as the initial value and zero as the final value.

Second first-order lag filter circuit 46, when phase selection signal SEL is "0", has the function of outputting the output of second subtracter 48, that is to say, of outputting the difference between phase θC of bus current $I_B$ outputted from second phase detector unit 41 and phase signal θI. When phase selector signal SEL becomes "1", it has the function of changing its output using the first-order lag characteristic which takes the difference between phase θC of bus current $I_B$ and phase signal θI as the initial value and zero as the final value.

Third subtracter 49 has the function of finding difference θV between phase θV of bus voltage $E_2$ from first phase detector unit 40 and the output of first first-order lag filter circuit 43, and of sending this to phase switching unit 44.

Fourth subtracter 50 has the function of finding difference θIC between phase θC of bus current $I_B$ from second phase detector unit 41 and the output of second first-order lag filter circuit 46, and of sending this to phase switching unit 44.

Phase switching unit 44, when phase selector signal SEL is "1", has the function of outputting difference θIV, outputted from third subtracter 49, as phase signal θI, and, when phase selector signal SEL is "0", of outputting difference θIC, outputted from fourth subtracter 50, as phase signal θI.

This phase signal θI outputted from phase switching unit 44 is what is sent to coordinate conversion unit 22, impedance drop compensator unit 26 and coordinate inversion unit 13.

The following is a description of the operation of a device composed in the above way.

Phase selector unit 42 judges the size of bus current $I_B$ against a threshold. When bus current $I_B$ is smaller than the threshold it outputs a phase selection signal SEL of "1", and when larger it outputs a phase selection signal SEL of "0".

Of these, when bus current $I_B$ is smaller than the threshold, first first-order lag filter circuit 43, by taking as its input phase selection signal SEL "1", changes its output using the first-order lag characteristic which takes the difference between phase θV of bus voltage $E_2$ and phase signal θI as the initial value and zero as the final value. Third subtracter 49 finds difference θIV between phase θV of bus voltage $E_2$ from first phase detector unit 40 and the output of first first-order lag filter circuit 43, and sends this to phase switching unit 44.

At the same time, second first-order lag filter circuit 46, by taking as its input phase selector signal SEL "0" via inversion unit 45, outputs the output of second subtracter unit 48, that is to say, the difference between phase θC of bus current $I_B$ from second phase detector 41 and phase signal θI.

Consequently, phase signal θI outputted from phase switching unit 44 gradually changes from phase θC of bus current $I_B$ to phase θV of bus voltage $E_2$ using the time constant of second first-order lag filter circuit 46.

On the other hand, when bus current $I_B$ is larger than the threshold, first first-order lag filter circuit 43, by taking as its input phase selection signal SEL "0", outputs the difference between phase θV of bus voltage $E_2$ from first phase detector 40 and phase signal θI. At the same time, second first-order lag filter circuit 46, when phase selector signal SEL is "0" via inversion unit 45, outputs the difference between phase θC of bus current $I_B$ from second phase detector 41 and phase signal θI.

Consequently, phase signal θI outputted from phase switching unit 44 gradually changes from phase θV of bus voltage $E_2$ to phase θC of bus current $I_B$ using the time constant of first first-order lag filter circuit 43.

Then, these phase signals θI are sent to coordinate conversion unit 22, impedance drop compensator unit 26 and coordinate inversion unit 13.

Thereafter, in the same way as in the operation of the above first embodiment, coordinate conversion unit 22 outputs d axis component $VC_d$ and q axis component $VC_q$ of series compensating voltage VC by coordinate conversion. Then voltage control unit 23 outputs the results of proportional-plus integral processing, so that the deviations become smaller, of the deviations between d axis component $VC_d$ and q axis component $VC_q$ and their command voltages $VC_d^*$ and $VC_q^*$ as command voltages $V_{Id}$ and $V_{Iq}$.

At the same time, impedance drop compensator unit 26 finds the voltage drop portion generated by the impedance of series transformer 8 based on bus current $I_B$ of transmission line 2, the impedance of series transformer θ and phase information θ. It then sends this voltage drop portion to each of adders 24 and 25.

Adders 24 and 25 respectively subtract the voltage drop portion found by impedance drop compensator unit 26 from the above command voltages $V_{Id}$ and $V_{Iq}$. They then send the respective results to coordinate inversion unit 13 as the d axis component and q axis component of the voltage command for inverter 3.

Coordinate inversion unit 13 uses phase information θ and inverts command values $VC_d^*$ and $VC_q^*$ of the d and q axis components of series compensating voltage VC to an alternating current synchronised with the bus current and provides this to gate control unit 14 as 3-phase voltage commands. Gate control unit 14 exercises ON/OFF control of the gates of the switching elements which compose inverter 3 in accordance with these 3-phase voltage commands.

In this way, when using the above sixth embodiment, needless to say the same results are achieved as for the above first embodiment. Phase information θ, used in the control of series compensating voltage VC, no longer changes rapidly, and the transient effect generated when phase information θ, used in control of series compensating voltage VC, on the stability of series compensating voltage VC and the tidal current of the AC system can be reduced.

(7) The following is a description, with reference to the drawings, of a seventh embodiment of the present invention. Identical reference numbers have been given to parts which are identical to those in FIG. 2 and their detailed descriptions have been omitted.

Figure 8:
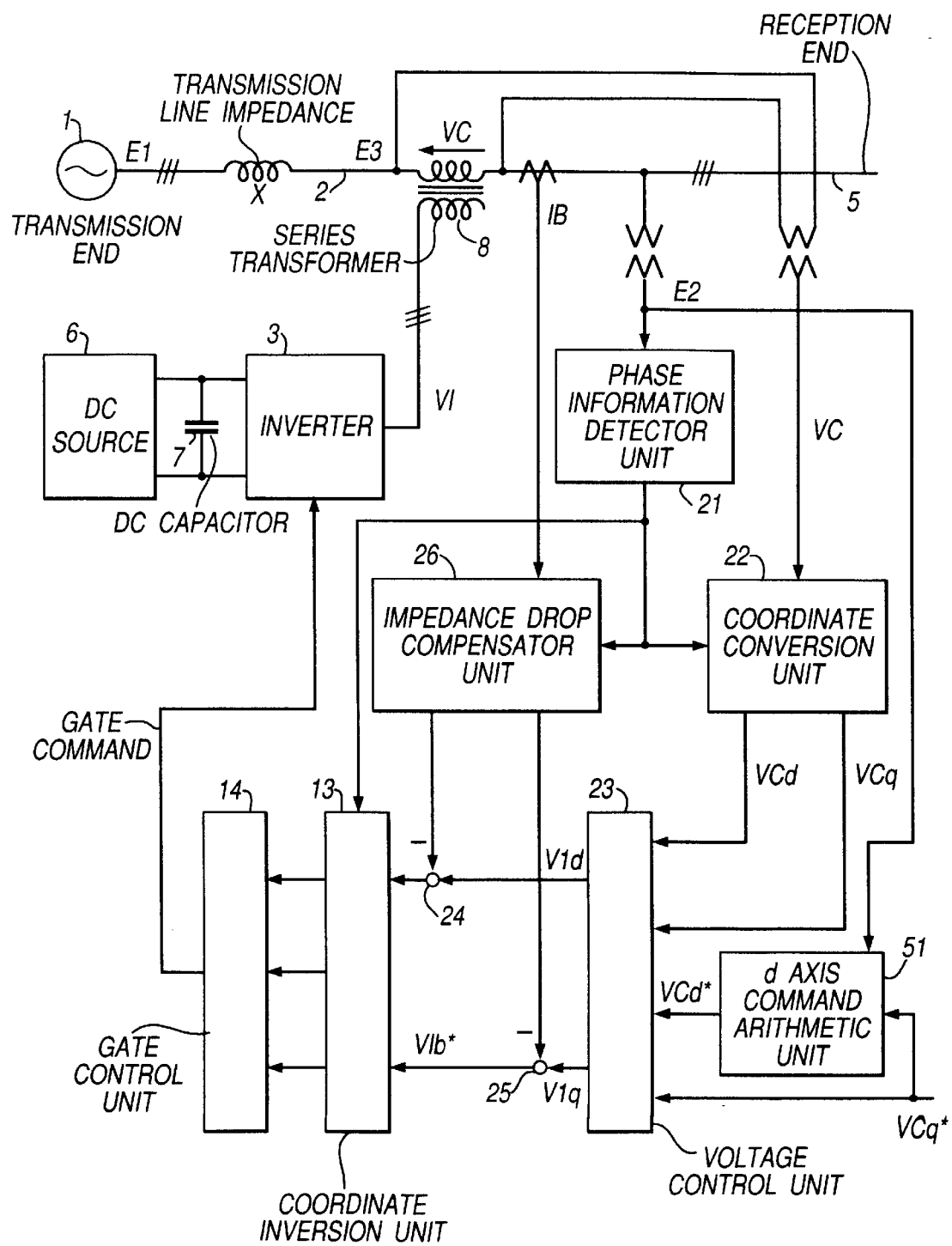
FIG. 8 is a block diagram showing a seventh embodiment of a controller for a power converter concerned in the present invention.

FIG. 8 Is a block diagram of a controller for a power converter.

d axis component (second voltage component) arithmetic unit 51 has the function of computing command voltages $VC_q^*$ and $VC_q^*$ for d axis component $VC_d$ and q axis component $VC_q$ out of series compensating voltage VC which is supplied to transmission line 2 via series transformer 8, and of providing these command voltages $VC_d^*$ and $VC_q^*$ to voltage control unit 23.

FIG. 9 is a vector diagram taking bus voltage $E_2$ as the reference (d axis) and showing bus voltages $E_2$ and $E_3$ of the both ends of series transformer 8 and series compensating voltage VC.

Here, the relationship to make the size $E_{2m}$ of bus voltage $E_2$ and the size $E_{3m}$ of bus voltage $E_3$ equal is expressed by the following equation.

$$VCd = \sqrt{E_{2m}^2 - VCq^2} - E_{2m} \qquad (5)$$

As this Equation (5) shows, when controlling d axis component $VC_d$ to a value such as can be obtained by calculation from size $E_{2m}$ of bus voltage $E_2$ and q axis component $VC_q$ of series compensating voltage VC, it is possible to make size $E_{2m}$ of bus voltage $E_2$ end size $E_{3m}$ of bus voltage $E_3$ equal. Therefore, by calculating d axis command voltage $VC_d^*$ from the following Equations (6) and (7), the sizes of the bus voltages at the both ends of series transformer 8 can be made equal.

$$VCd^* = \sqrt{E_{2m}^2 \cdot VCq^2} - E_{2m} \qquad (6)$$

$$VCd^* = \sqrt{E_{2m}^2 - VCq^{*2}} - E_{2m} \qquad (7)$$

The above Equation (6) is an equation to calculate d axis command value $VC_d^*$ of series compensating voltage VC from size $E_{2m}$ of bus voltage $E_2$ and the detected value of q axis voltage component $VC_q$ of series compensating voltage VC. Equation (7) is an equation to calculate d axis command value $VC_d^*$ from the detected value of size $E_{2m}$ of bus voltage $E_2$ and the command value of q axis component $VC_q$ of series compensating voltage VC.

d axis command arithmetic unit 51 has the function of finding d axis command value $VC_q^*$ by calculation from Equation (7). However, it may be calculated by taking as an input d axis component $VC_d$ of series compensating voltage VC instead of d axis command value $VC_d^*$, which is one of the inputs of d axis command arithmetic unit 51, and calculating d axis command value $VC_d^*$ from Equation (6).

The following is a description of the operation of a device composed in the above way.

Phase information detector unit 21 detects phase information θ from bus voltage $E_2$, and sends it to coordinate conversion unit 22, impedance drop compensator unit 26 and coordinate inversion unit 13.

Of these, coordinate conversion unit 22 performs coordinate conversion of series compensating voltage VC which is applied to transmission line 2, and outputs d axis component $VC_d$ and q axis component $VC_q$.

Also, d axis command arithmetic unit 51 calculates command voltages $VC_q^*$ and $VC_q^*$ for d axis component $VC_d$ and q axis component $VC_q$ out of series compensating voltage VC, and provides these command voltages $VC_d^*$ and $VC_q^*$ to voltage control unit 23, Voltage control unit 23 compares these command voltages $VC_d^*$ and $VC_q^*$ with d axis component $VC_d$ and q axis component $VC_q$ and finds any deviations. It outputs the results of proportional-plus-integral processing of each deviation, so that the deviations become smaller, as command voltages $V_{Id}$ and $V_{Iq}$.

Thereafter, In the same way as in the operation of the above first embodiment, impedance drop compensator unit 26 finds the impedance drop portion generated by the impedance of series transformer 8 based on bus current $I_B$, the impedance of series transformer 8 and phase information θ, and sends this to each of adders 24 and 25.

Adders 24 and 25 subtract the voltage drop portion found by impedance drop compensator unit 26 from the above command voltages $V_{Id}$ and $V_{Iq}$. They then send the respective results to coordinate inversion unit 13 as the d axis component and q axis component of the voltage command for inverter 3.

Coordinate inversion unit 13 uses phase information 6 and inverts command values $VC_q^*$ and $VC_q^*$ of the d and q axis components of series compensating voltage VC to an alternating current synchronised with the bus current and provides this to gate control unit 14 as 3-phase voltage commands. Gate control unit 14 exercises ON/OFF control of the gates of the switching elements which compose inverter 3 in accordance with these 3-phase voltage commands.

In this way, when using the above seventh embodiment, needless to say the same results are achieved as for the above first embodiment. The size of the bus voltages of both ends of series transformer 8 can be made equal, and the fluctuation of the bus voltage can be reduced by introducing series compensating voltage VC in series into the AC system.

(8) The following is a description, with reference to the drawings, of an eighth embodiment of the present invention. Identical reference numbers have been given to parts which are identical to those in FIG. 2 and their detailed descriptions have been omitted.

Figure 10:
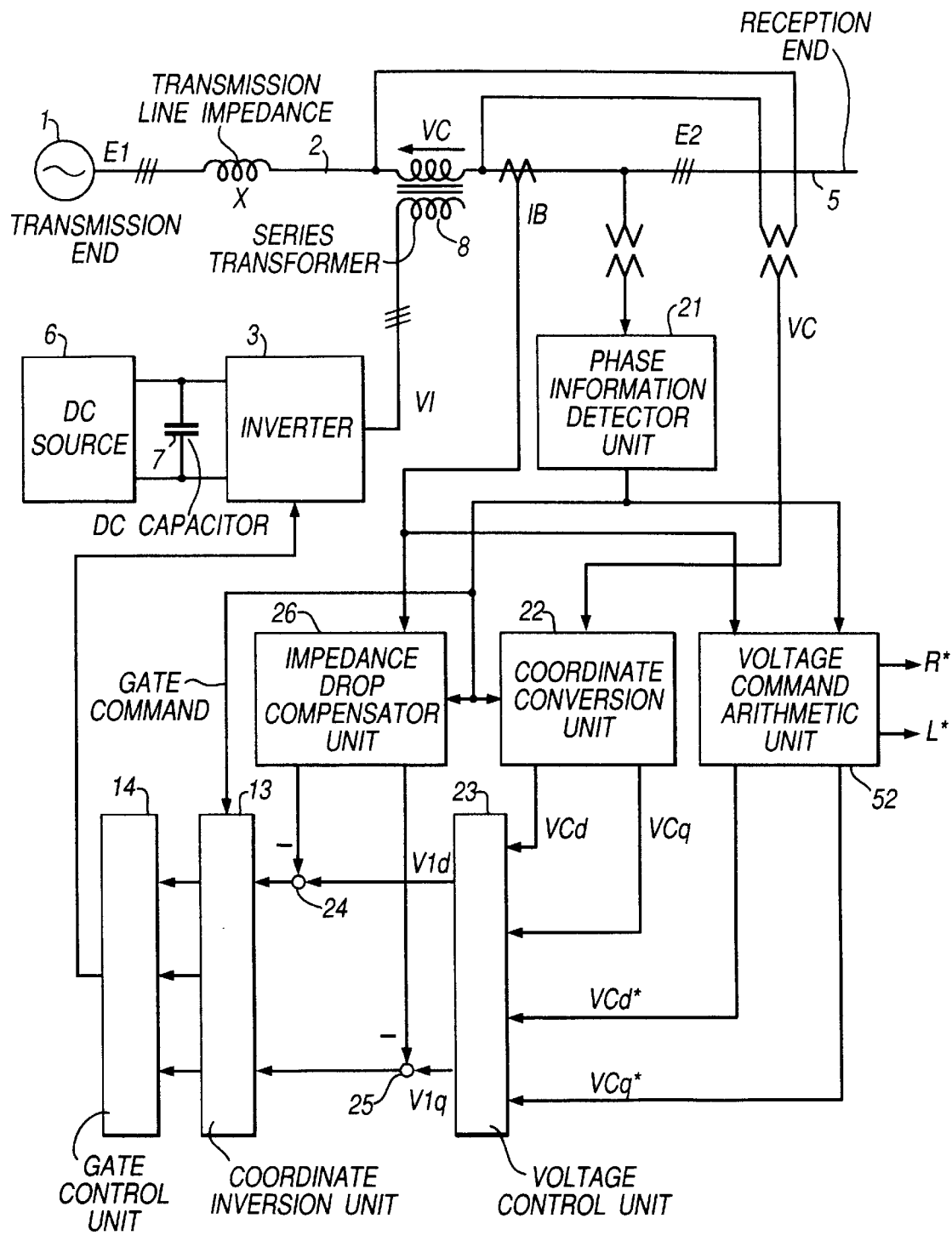
FIG. 10 is a block diagram showing an eighth embodiment of a controller for a power converter concerned in the present invention.

FIG. 10 is a block diagram of a controller for a power converter.

Voltage command arithmetic unit 52 has the function of calculating the command values $VC_d^*$ and $VC_q^*$ of d and q axis components in series compensating voltage VC, which is supplied to transmission line 2 via series transformer 8, based on bus current $I_B$, phase information θ of bus voltage $E_2$ and impedance compensation command values R* and L* of series transformer 8. It also has the function of providing these d and q axis component command values $VC_d^*$ and $VC_q^*$ to voltage control unit 23.

FIG. 11 shows a 3-phase AC bus which includes an impedance composed of reactor L and resistor R.

The relationship of the following equation can be established between bus current $I_B$ and voltage drop VL due to the impedance.

$$\begin{bmatrix} VLd \\ VLq \end{bmatrix} = \begin{bmatrix} R+sL & -\omega L \\ \omega L & R+sL \end{bmatrix} \begin{bmatrix} IBd \\ IBq \end{bmatrix} \quad (8)$$

Here, s is a differential operator and ω is the various frequencies of the AC bus.

Consequently, if a voltage equal to voltage drop VL calculated from the above Equation (8) is introduced in series into the AC bus, it is possible to produce an equivalent change in the impedance of the AC bus.

However, voltage command arithmetic unit 52 has the function of extracting the d and q axis components $I_{Bd}$ and $I_{Bq}$ of bus current $I_B$, using phase information θ of bus voltage $E_2$, which is obtained by phase information detector unit 21, and of calcularing series compensating voltage commands $VC_d^*$ and $VC_q^*$ from impedance compensation commands R* and L* using the following equation.

$$\begin{bmatrix} VCd^* \\ VCq^* \end{bmatrix} = \begin{bmatrix} R^*+sL & -\omega L^* \\ \omega L & R^*+sL^* \end{bmatrix} \begin{bmatrix} IBd \\ IBq \end{bmatrix} \quad (9)$$

Here, the transient term sL* contained in the above Equation (9) is in order to consider the instability of the AC system and may be omitted.

The following is a description of the operation of a device composed in the above way.

Phase information detector unit 21 detects phase information θ from bus voltage $E_2$, and sends this to coordinate conversion unit 22, impedance drop compensator unit 26 and coordinate inversion unit 13. Of these, coordinate conversion unit 22 outputs d axis component $VC_d$ and q axis component $VC_q$ by coordinate conversion of series compensating voltage VC which is supplied to transmission line 2 from series transformer 8.

Also, voltage command arithmetic unit 52 extracts the d and q axis components $I_{Bd}$ and $I_{Bq}$ of bus current $I_B$ using phase information θ of bus voltage $E_2$ obtained by phase information detector unit 21, finds series compensating voltage commands $VC_d^*$ and $VC_q^*$ by calculation from impedance compensation command values R* and L*, and sends them to voltage control unit 23.

Voltage control unit 23 compares series compensation command voltages $VC_d^*$ and $VC_q^*$ with d axis component $VC_d$ and q axis component $VC_q$ of series compensating voltage VC and finds any deviations. It outputs the results of proportional-plus-integral processing of each deviation, so that the deviations become smaller, as command voltages $V_{Id}$ and $V_{Iq}$.

Thereafter, in the same way as in the operation of the above first embodiment, impedance drop compensator unit 26 finds the impedance drop portion generated by the impedance of series transformer 8 based on bus current $I_B$, the impedance of series transformer 8 and phase information θ, and sends this to each of adders 24 and 25.

Adders 24 and 25 subtract the voltage drop portion found by impedance drop compensator unit 26 from the above command voltages $V_{Id}$ and $V_{Iq}$. They then send the respective results to coordinate inversion unit 13 as the d axis component and q axis component of the voltage command for inverter 3.

Coordinate inversion unit 13 uses phase information θ and inverts command values $VC_d^*$ and $VC_q^*$ of the d and q axis components of series compensating voltage VC to an alternating current synchronised with the bus current and provides this to gate control unit 14 as 3-phase voltage commands. Gate control unit 14 exercises ON/OFF control of the gates of the switching elements which compose inverter 3 in accordance with these 3-phase voltage commands.

Here, by making impedance compensation command values R* and L* inputted to voltage command arithmetic unit 52 negative values, it is possible to produce an equivalent reduction in the impedance of the AC bus, and by making them positive values, it is possible to produce an equivalent increase in the impedance of the AC system.

In this way, when using the above eighth embodiment, needless to say the same results are achieved as for the above first embodiment. By making impedance compensation command values R* and L* negative values, it is possible to produce an equivalent reduction in the impedance of the AC bus, and by making them positive values, it is possible to produce an equivalent increase in the impedance of the AC system. Thus, the tidal current of the AC bus can be adjusted, and the power transmission limits can be improved.

When using the present invention as described above, it is possible to provide a controller for a power converter which can effectively enable stable adjustment of the active power and the reactive power of an AC system using a limited capacity.

Also, when using the present invention, a controller for a power converter can be provided which can prevent the series compensating voltage which is introduced in series into the AC system becoming unstable in states in which the bus current is small.

Moreover, when using the present invention, a controller for a power converter can be provided which can control the hunting phenomenon in which the result of comparison of the size of the bus current with a threshold varies a large number of times over a short period of time. Thus, stable control of the series compensating voltage which is introduced into the AC system is possible.

Furthermore, when using the present invention, a controller for a power converter can be provided which can reduce the transient effect on the stability of the series compensating voltage and on the tidal current of the AC system generated when the phase information used in the control of the series compensating voltage is switched.

Still further, when using the present invention, a controller for a power converter can be provided which can make the sizes of the bus voltages of the two ends of the series transformer equal, and can thus reduce the fluctuation of the bus voltage due to the introduction of the series compensating voltage in series into the AC system.

Even further, when using the present invention, a controller for a power converter can be provided which can make an equivalent reduction or an equivalent increase in the impedance of the AC bus, and can thus adjust the tidal current of the AC bus and improve the power transmission limits Obviously, numerous additional modifications and variations of the present invention are possible in light of the above teachings. It is therefore to be understood that within the scope of the appended claims, the invention may be practised otherwise than as specially described herein.

What is claimed as new and is desired to be secured by Letters Patent of the United States is:

1. A controller for a power converter which supplies an AC output of an inverter to an AC system via a transformer and varies the voltage and current, or power, of said AC system, comprising:
   a feedback control circuit for finding a voltage drop portion generated by an impedance of said transformer and controlling an output of said inverter so that said feedback control circuit compensates for said voltage drop portion, wherein said feedback control circuit comprises:
      a phase information detector unit for detecting phase information from a bus voltage or a bus current of said AC system;
      an impedance drop compensator unit which finds said voltage drop portion generated by said impedance of said transformer based on said bus current of said AC system, said impedance of said transformer and said phase information detected by said phase information detector unit;
      adders which input command voltages relating to a first voltage component of the same phase as said bus voltage of said AC system in the voltage supplied via said transformer to said AC system and a second voltage component of a phase which is advanced a specified phase from the phase of said first voltage component, subtract said voltage drop portion found by said impedance drop compensator unit from these command voltages, and output the results of the subtractions as voltage commands for said inverter; and
      an inverter control unit for restoring the inverter voltage commands outputted from these adders to the phase of said AC system based on the phase information detected by said phase information detector unit, and operationally controlling said inverter.

2. The controller for a power converter according to claim 1, further comprising:
   a coordinate conversion unit which outputs said first voltage component of the same phase as said bus voltage of said AC system by coordinate conversion of the voltage supplied via said transformer to said AC system and said second voltage component of a phase which is advanced a specified phase from said phase of said first voltage component; and
   a voltage control unit which finds deviations between said first and second voltage components outputted from said coordinate conversion unit and said command voltages, and sends voltages which reduce said deviations to said adders as said command voltages.

3. The controller for a power converter according to claim 1, further comprising:
   a signal switching unit which compares said bus current with a pre-determined threshold and, when said bus current is smaller than said predetermined threshold, provides said bus voltage to said phase information detector means and, when said bus current is great than said predetermined threshold, provides said bus current to said phase information detecting unit.

4. The controller for a power converter according to claim 1, further comprising:
   a signal switching unit which detects oscillation from said bus current and, depending on the size of said oscillation, provides said bus voltage or said bus current to said phase information detector unit and, when said oscillation does not vary from a specified range, provides a signal of the same type as said signal which was used in the past to said phase information detector unit.

5. The controller for a power converter according to claim 1, wherein said phase information detector unit includes:
   a first phase detector which detects phase information for said bus voltage;
   a second phase detector which detects phase selector signal according to the size of said bus current;
   a phase selector unit which outputs a phase selector signal according the size of said bus current;
   a filter for obtaining a difference between the phase of said bus voltage or the phase of said bus current and at least said phase information which is provided to said impedance drop compensator unit or an output of a first-order lag characteristic; and
   a phase switching unit which selects said output of said filter according to said phase selector signal outputted from said phase selector unit.

6. The controller for a power converter according to claim 1, further comprising:
   a second voltage component arithmetic unit which computes said command voltages for a first voltage component of said same phase for the bus voltage of said AC system and for a second voltage component of a phase specifically phase-advanced phase from said phase of said first voltage component based on said bus voltage, and provides these command voltages to said voltage control unit.

7. The controller for a power converter according to claim 1, further comprising:
   a voltage command arithmetic unit which computes said first and second voltage components in the voltage supplied via said transformer to said AC system based on the phase information for said bus current and said bus voltage and said impedance command for said transformer, and provides these first and second voltage components to said voltage control unit.

* * * * *